United States Patent [19]
Snell

[11] 3,913,321
[45] Oct. 21, 1975

[54] GAS TURBINE ENGINE POWER PLANT

[75] Inventor: Leonard Stanley Snell, Bristol, England

[73] Assignee: Rolls-Royce (1971) Limited, London, England

[22] Filed: Nov. 12, 1973

[21] Appl. No.: 414,990

[30] Foreign Application Priority Data
Nov. 17, 1972 United Kingdom............ 53160/72

[52] U.S. Cl............................................. 60/226 R
[51] Int. Cl.² ......................................... F02K 3/04
[58] Field of Search.......... 60/226 A, 270 R, 226 R, 60/225, 262

[56] References Cited
UNITED STATES PATENTS

| | | | |
|---|---|---|---|
| 3,316,717 | 5/1967 | Castle et al. ...................... | 60/226 R |
| 3,528,246 | 9/1970 | Fischer............................... | 60/226 R |
| 3,688,504 | 9/1972 | Hutchinson........................ | 60/226 R |
| 3,792,584 | 2/1974 | Klees.................................. | 60/226 R |
| 3,841,091 | 10/1974 | Sargisson et al.................. | 60/262 X |

FOREIGN PATENTS OR APPLICATIONS
713,783  8/1954  United Kingdom............... 60/226 R

*Primary Examiner*—William L. Freeh
*Assistant Examiner*—Robert E. Garrett
*Attorney, Agent, or Firm*—Stevens, Davis, Miller & Mosher

[57] ABSTRACT

A turbojet convertible to a by-pass engine for use particularly in supersonic transports. The compressor of the gas turbine engine is split into two axially separate parts: valving is positioned between these two parts to allow either of two modes of operation:

i. turbojet, with the output of the upstream compressor part passing to the downstream compressor part, or ii. by-pass engine, with the output of the upstream compressor part passing to ambient and ambient air being ducted into the downstream compressor part.

3 Claims, 4 Drawing Figures

GAS TURBINE ENGINE POWER PLANT

This invention relates to gas turbine power plant for aircraft propulsion.

Most aircraft ideally require a particular type of power plant for take-off and acceleration and another for cruise. Aircraft engines are usually designed as a compromise in the form which will come closest to the various roles the engine is required to perform in. However, for some aircraft the ideal requirement is a by-pass engine for take-off in order to achieve low noise whilst for cruise a turbojet is needed. Such a power plant is required, for example, in a passenger aircraft which is intended for supersonic flight.

According to this invention a gas turbine power plant comprises in flow series a first air coompressor means, an annular arrangement of ducts, a second air compressor means, a combustor, and turbine means for driving the compressor means; wherein certain of the ducts are movable between respective first positions for conveying air from the first to the second compressor means and respective second positions for conveying air from the first compressor means to ambient atmosphere, and wherein other of the ducts are movable between respective first positions for conveying air from the first to the second compressor means and respective second postions for conveying air from ambient atmosphere to the second compressor means.

The invention makes it possible to combine in the same power plant the properties of a straight turboject (desirable for supersonic flight) and a by-pass engine of relatively high by-pass ratio (desirable for relatively quiet take-off) while preserving a relatively small power plant frontal area, and the invention further provides an advantageous arrangement for changing from the turbojet to the by-pass mode.

Preferably, a first and a second air intake are respectively provided for the first and second air compressor means and a first and a second discharge nozzle respectively provided for the exhaust from the turbine means and the exhaust from the first air compressor means.

An example of a gas turbine engine power plant according to this invention will now be described, by way of example only, with reference to the accompanying drawings, wherein.

Figure 1:
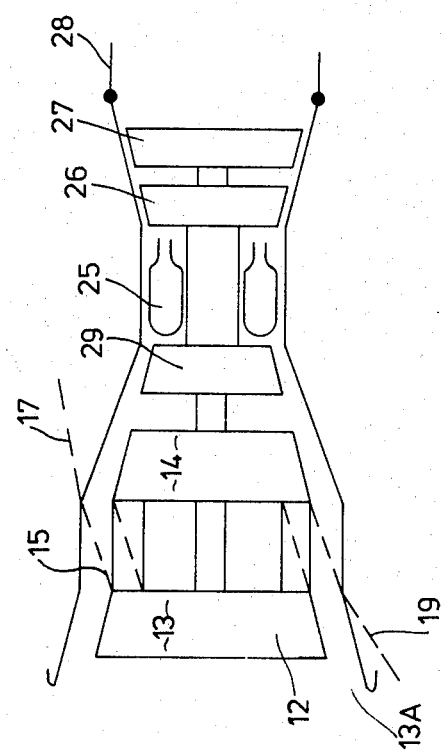
FIG. 1 is a diagram of a gas turbine engine power plant.

Referring to the drawings a generally square nacelle 10 houses a gas turbine engine 11 comprising a compressor 12 havig upstream and downstream portions 13, 14. A valve assembly 15 is provided for ducting the output of the upstream portion 13 either into the downstream portion 14 or ducting said output into a manifold 16 leading to atmosphere through a door 17 in the nacelle. While the output of the upstream portion 13 is ducted in this way, the valve assembly opens the inlet of the downstream portion 14 of the compressor to atmosphere through a manifold 18 leading from a door 19 in the nacelle.

The valve assembly comprises an annular arrangement of ducts 20 which are pivoted between positions 20A, 20B (FIG. 3) in which the ducts are respectively in first, stowed positions 20A connecting portion 13 to portion 14 and second, inclinded positions 20B connecting the portion 13 to the manifold 16. The ducts 20 are spaced apart circumferentially and are interdigitated with similar ducts 21 which are pivotal between positions 21A, 21B in which the ducts 21 are respectively situated in first, stowed positions 21A connecting manifold 13 to portion 14 and second, inclined positions 21B connecting portion 14 to the manifold 18.

Figure 3:
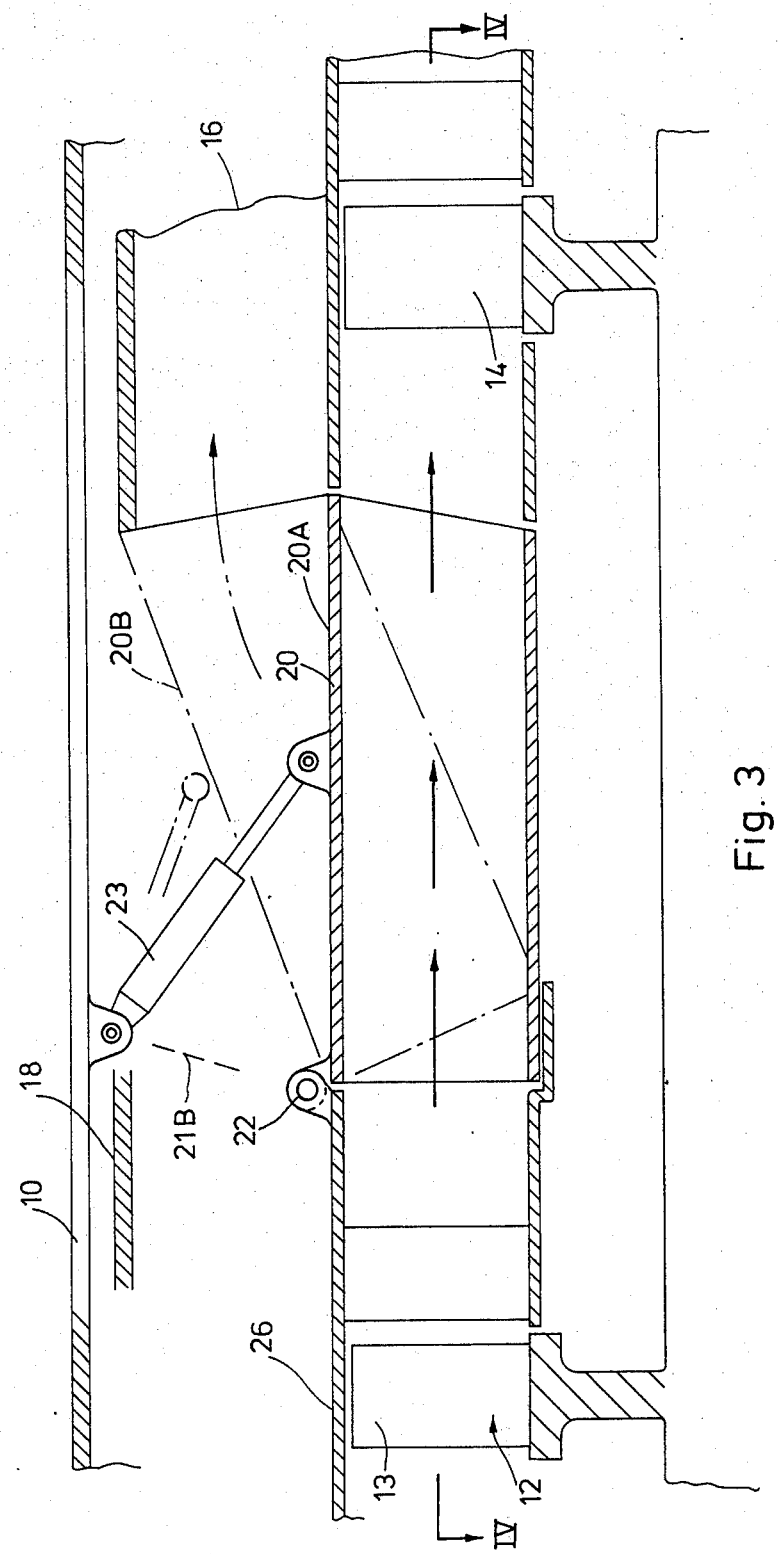
FIG. 3 is a sectional elevation of a detail.
Figure 4:
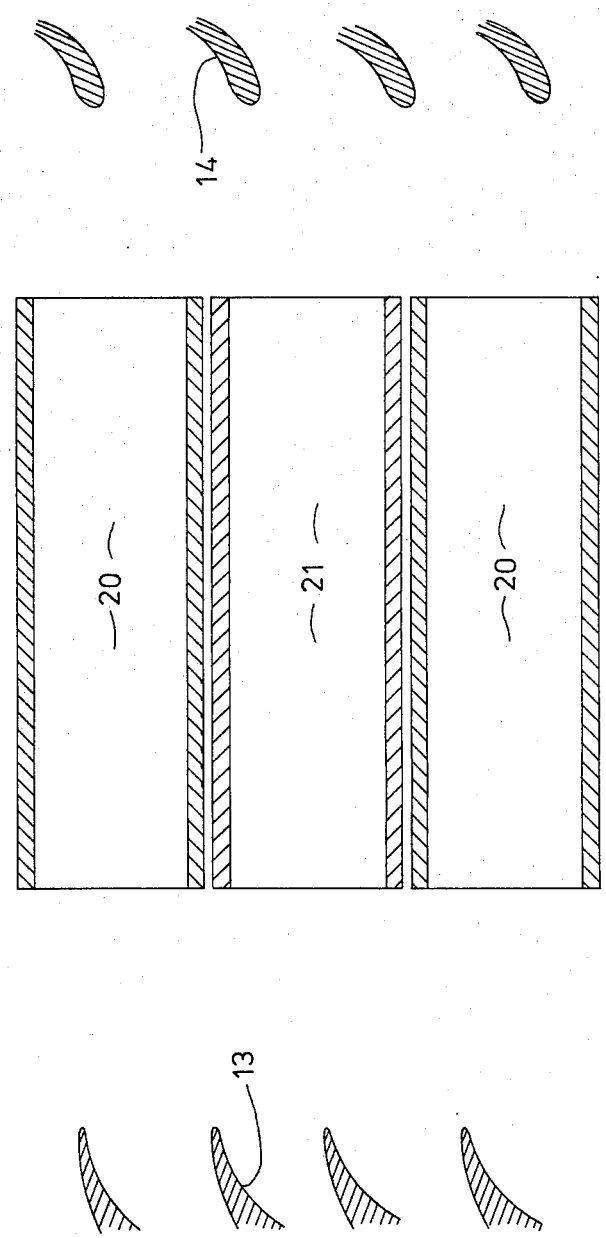
FIG. 4 is a developed part view of the line IV—IV of FIG. 3.

Referring to FIG. 3 one of the ducts 20 is shown as supported by a pivot 22 and movable between the positions 20A, 20B by means of a fluid pressure motor 23 connected between the duct and the macelle 10. FIG. 4 shows one each of the ducts 20, 21 and blading of compressor portions 13, 14.

It will be understood that motors similar to the motor 23 are provided in respect of the ducts 20 as well as the ducts 21.

The portion 13 has an air intake 13A. The latter and the door 19 constitute respectively first and second air intakes for the power plant. The engine is a two-spool gas turbine engine with the usual combustor 25 and turbines 26, and 27 and exhaust nozzle 28 arranged in flow series with the compressors, the turbine 26 being arranged to drive a high pressure compressor 29 and turbine 27 being arranged to drive the low pressure compressor 12. The nozzle 28 and the door 17 constitute first and second discharge nozzles for the power plant. Means, not shown but well understood per se, are provided to open the doors when the valves 20, 21 are in their positions 20B, 21B.

The ducts, when in their stowed positions 20A, 21A, lie flush with a casing 26 connecting the portions 13, 14. When in their operative positions 20B, 21B the ducts project radially from the casing.

Figure 2:
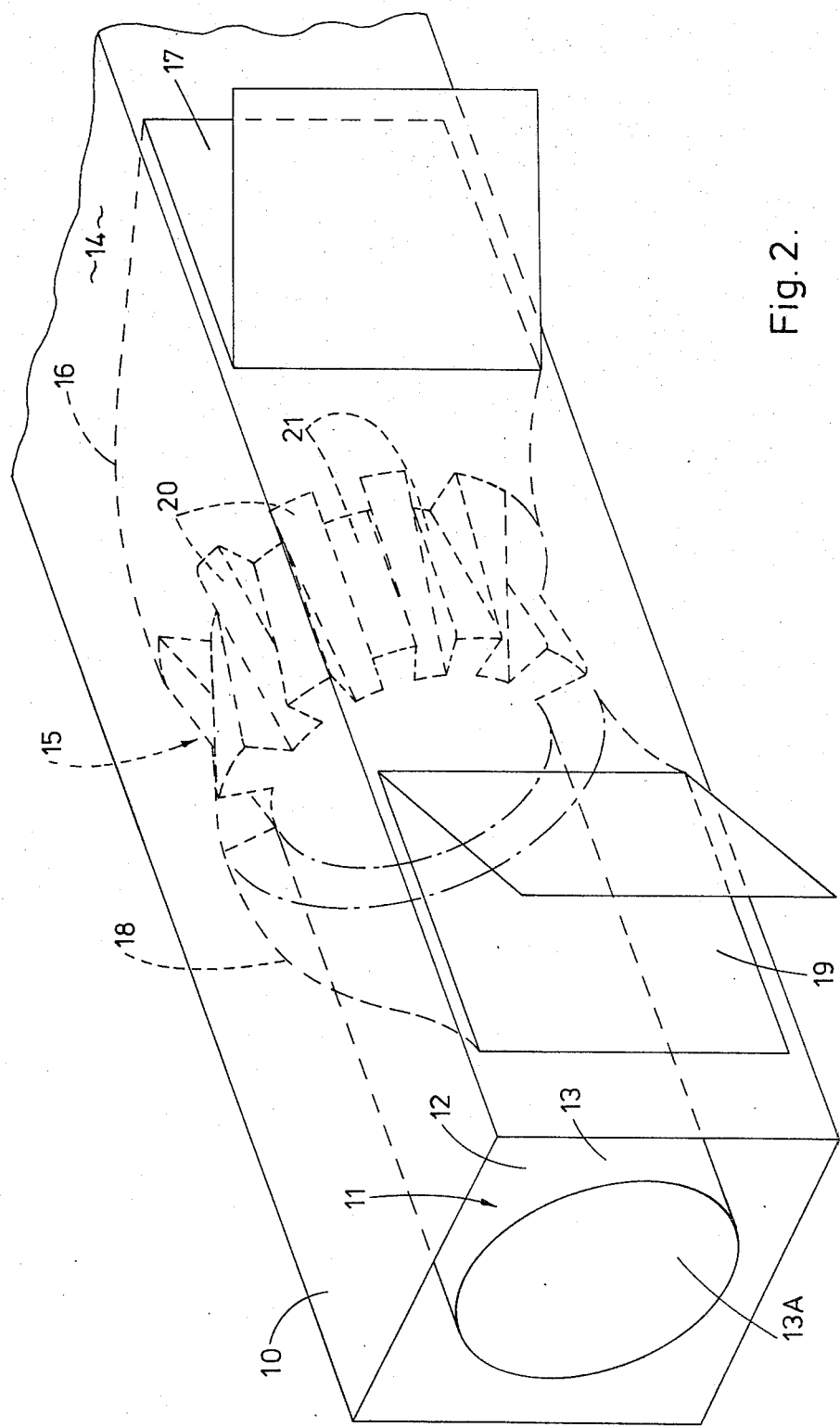
FIG. 2 is a perspective view of the arrangement of the invention.

In FIG. 1 the nacelle is shown with one door 17 and one door 19 open in the broken line position, these doors being on opposite sides of the nacelle. In FIG. 2 the doors 17 and 19 are shown on one side only: it will be understood that these doors can alternatively be provided on one or both sides or even on the underside of nacelle 10.

In a modification (not shown) the ducts project directly to atmosphere i.e. the nacelle and manifolds are not provided, and in this case the ducts 20 themselves define the discharge nozzles for the upstream portion 13 while the ducts 21 define intakes for the downstream portion 14.

What we claim is:

1. A gas turbine power plant comprising in flow series a first air compressor means, a second air compressor means, a combustor, and turbine means for driving the compressor means, an annular arrangement of ducts comprising first ducts movable between respective first positions for conveying air from the first to the second compressor means and respective second positions for conveying air from the first compressor means to ambient atmosphere, and second ducts movable between respective first positions for conveying air from the first to the second compressor means and respective second positions for conveying air from ambient atmosphere to the second means, characterized in that the first and second ducts are arranged in a symmetrical annular array with the second ducts interdigitated between the first ducts and wherein each duct comprises a wall member defining the outward boundary of the duct in the radial direction of said power plant and two sides each lying in the said radial direction, and wherein each side of each first duct lies closely adjacent a side of a second duct and means are provided forming hinge connections at the upstream end of the wall member of each first duct and at the downstream end of the wall member of each second duct for facilitating the movement of said ducts between the first and second positions.

2. A power plant according to claim 1 wherein the first and second air compressor means are mechanically connected together.

3. A power plant according to claim 1, wherein the first and second air compressor means form the low pressure compressor of a two-spool engine.

* * * * *